Oct. 5, 1937.                A. P. PAiNE                2,095,006
                         TAPE PERFORATING MACHINE
                  Filed April 19, 1932        8 Sheets-Sheet 1

INVENTOR
ARTHUR P. PAINE
BY Morrison, Kennedy & Campbell
ATTORNEYS

Fig. 4

Oct. 5, 1937.  A. P. PAINE  2,095,006

TAPE PERFORATING MACHINE

Filed April 19, 1932  8 Sheets-Sheet 5

INVENTOR
ARTHUR P. PAINE
BY Morrison, Kennedy & Campbell
ATTORNEY

Patented Oct. 5, 1937

2,095,006

UNITED STATES PATENT OFFICE 2,095,006

TAPE PERFORATING MACHINE

Arthur P. Paine, Garden City, N. Y., assignor to Mergenthaler Linotype Company, a corporation of New York Application April 19, 1932, Serial No. 606,267

25 Claims. (Cl. 164—113)

This invention is directed to an improved machine for producing perforated tapes, said tapes being adapted to control in a separate machine the release of matrices and spacers of typographical composing machines, such as linotype machines of the general organization represented in U. S. Letters Patent to O. Mergenthaler No. 436,532. In these latter machines, the matrices and spacers, after being released from their respective magazines by the operation of power-actuated escapement devices, are composed in line and then presented to the justifying and casting devices for the production of a slug or linotype bearing on its edge a justified line of printing characters. When the machines are operated by a perforated tape, the symbols produced in the tape automatically control the operation of the power-actuated escapement devices, each symbol representing a particular matrix or spacer which is to be released in composing a line, and the symbols being disposed in groups or rows representative of the successive lines to be composed or the printing slugs to be cast therefrom. As is well understood, the number of symbols in each group or row must correspond to the number of matrices and spacers to be set up in the line represented by that particular group, and herein lies one of the main difficulties in attempting to control the operation of a linotype machine by a perforated tape, it being obvious that the actual number of matrices and spacers which can be composed in a line of a given length will depend upon the size or thickness of the matrices comprising the particular font in use. Bearing in mind the great number of different sizes of matrix fonts employed in linotype machines, as well as the wide variation prevailing between the individual matrices comprising each font, it is obvious that the number of symbols which should be produced in the tape to compose a given-length line of matrices of a particular font is difficult of ascertainment.

In an attempt to solve this problem, it has been proposed to associate with the perforating apparatus, for the guidance of the keyboard operator, a counting mechanism which will register and indicate the number of units represented by the matrices to be released by the symbols produced, but the great number of units which must be reckoned with in the case of linotype matrices (well above forty-five), as well as the necessity for variations in adjustment to accord with the numerous matrix fonts employed, lead into so many complications as to render the counting mechanism altogether impractical and unreliable.

While successful counting mechanisms have been employed in connection with perforators used for the production of perforated tapes to control the operation of typewriters and type-casting machines other than linotype machines, it must be remembered that the number of units required for these machines is comparatively small, eighteen being about the maximum for type-casting machines and a much less number for typewriters.

The present invention is intended to overcome the foregoing and other difficulties and contemplates a simple and thoroughly reliable device by which the operator may determine with accuracy the exact number of symbols which should be made in the perforated tape to compose a justifiable line of matrices and spacers of any given length in the case of any selected font, so that when the perforated tape is run through a linotype machine of the tape controlled type, it can be relied upon to produce a justified line of type corresponding to the characters represented by the symbols produced in the tape by the perforating machine.

In carrying out the invention, it is proposed to combine with the tape-perforating unit a set of dummy matrices or indicators, varying in thickness to correspond to the matrices and spacers (both the non-expansible, as well as the expansible type commonly called "spacebands") of the linotype machine to be operated by the perforated tape, and to control the operation of both the perforating unit and dummy matrices from a common keyboard, in such manner that as each symbol is produced in the tape by the actuation of a finger key, a dummy matrix corresponding in thickness to the matrix or the spacer or the spaceband represented by said symbol and to be released by it from the magazines of the machines to be operated, is presented to a measuring device, which measures the thickness of such dummy matrix. The results of all the measurements are integrated and indicated to the operator so that he may tell at a glance the condition of the line being composed. The indicating means preferably comprises a pointer moving over a predetermined distance comparable in length to a justified line of matrices, spacers and spacebands for any selected matrix or font. A scale graduated in ems is associated with the pointer to facilitate the reading of the pointer indications, the scale thus reading as the sum of the matrices, the spacers, and the spacebands used.

Whenever the space key is depressed, a dummy matrix corresponding in thickness to the unexpanded thickness of the space band employed is presented to the measuring device, as in the case of the other dummy matrices. Another pointer is provided, adapted to move along the scale in a direction opposite from that of the first pointer. This second pointer moves through a distance corresponding to the difference between the unexpanded and expanded thickness of the space band used, and when the two pointers meet the total thickness of all the matrices corresponding to the symbols used, plus the thickness of the unexpanded spacebands and their potential expansibility equals the length of the line desired. The line may be completed any time after the pointers meet but before the first pointer reaches the end of its travel, for between these limits the matrices and spacebands as set up on the machine operated by the tape may be justified to produce a line of proper length.

In practise, the dummy matrices will preferably be made of the same identical thickness as the matrices they are intended to represent, although it is obvious that if desired they could be made thicker or thinner, so long as some definite proportion be maintained to the actual thickness of the matrices. The expression "corresponding in thickness" is therefore intended to mean identity of thickness or some definite relation in thickness between the dummy matrices and the actual matrices used in the linotype machine operated.

As regards the spacers and the spacebands, the dummy matrices used to represent them will likewise correspond in thickness thereto, although it may be stated here that the thickness of the dummy matrix for an expansible spaceband will correspond to the thickness of such spaceband in its unexpanded condition, that is to say, as the spaceband is composed in line and before it is expanded to justify the line.

There will thus be as many different thicknesses or dummy matrices employed in the set used as there are different thicknesses of matrices, spacers and spacebands employed in the linotype machine which is controlled by the perforated tape. While regular linotype matrices and spacers may be used as dummy matrices, except as regards the expansible spacebands, for which special blank matrices will be used to facilitate handling, it may be more desirable to make up a special set of dummy matrices for each matrix font to be used in the linotype machine, since these sets necessitate the use of only one dummy matrix for each of the different matrix characters employed in a particular font.

From what has been said above in regard to the thickness of the dummy matrices, it may be gathered that the invention also contemplates the use of as many different sets of dummy matrices as there are matrix fonts to be employed in the linotype machine to be governed by the perforated tape. In other words, when the perforator is intended to produce symbols in the tape to control the release of matrices, say, of a 6 pt. font, the machine for controlling the tape perforator will be equipped with a set of dummy matrices of corresponding thickness, that is to say, of 6 pt. size. On the other hand, if the symbols are to control the release of matrices of, say, a 12 pt. font, then the dummy matrices used should correspond to matrices of a 12 pt. font.

In some instances, it may be desirable to use expansible spacebands of different widths of expansibility for a particular font, and for this purpose an adjustable feature is provided by which the travel of the pointer measuring the difference between the unexpanded and expanded size of spaceband may be varied to suit different conditions.

More generally speaking, therefore, this invention presents a perforating machine made up essentially of three distinct units, namely, a perforating mechanism, a measuring device for integrating the thickness of the dummy matrices corresponding to the symbols formed by the perforating mechanism, and a single keyboard for operating the perforating mechanism and the measuring device simultaneously. It will be understood that, whatever combination or code system is employed in perforating the tape, it should be followed in operating the linotype machine by the tape, in order that the symbols produced in the tape will be effective to control the release of the proper matrices when the tape is run through the machine. Any code system desired may be used, as, for example, that employed in the so-called "Teletypesetter" machine of recent development, so that no further elaboration seems necessary.

While the present invention is intended primarily to produce a tape adapted to control the operation of a linotype machine, it should be understood that the tape might be used as well to control the operation of some other kind of composing machine, such, for example, as a machine which handles type or dies or other typographical elements used for printing purposes. The reference in the appended claims, therefore, to matrices and spacers is to be understood as referring to such other typographical elements rather than alone to linotype matrices and spacers.

While, also, the invention is herein shown and described as applied to an actual perforating unit, it should be understood that any other form of tape-marking apparatus might be employed instead, and the reference in the appended claims to a tape-perforating apparatus and a perforated tape is intended to comprehend any form of tape-marking apparatus and any kind of tape whose symbols are capable of controlling the release of the selected typographical elements.

Referring to the drawings:

Fig. 14 is an enlarged section through the scale and pointer mechanism; and

Fig. 15 is a view from the side of the machine, showing the means for adjusting for spacebands of different expansibilities, while Fig. 16 is a section on line 16—16 of Fig. 9, showing the details of construction of the same mechanism.

The improved machine comprises three essential elements, namely, a perforating unit A, a measuring unit B and a keyboard C, which elements may be modified as desired so long as they are made to cooperate in the manner herein set forth. The tape-perforating unit and the keyboard are substantially the same as those illustrated in Patent No. 2,002,516, granted May 28th, 1935, to William Ackerman, to which reference may be had, if desired.

Preferably, the tape-perforating unit comprises a pair of guide plates A1 and A2 (Fig. 1), between which a tape T is adapted to be drawn and perforated by a series of six vertically-moving punch rods A5 arranged in a line at right angles to the travel of the tape and in groups of three, the groups being spaced apart to provide for a line of feed perforations inserted along the center of the tape by the vertically-moving overhead punch rod A6.

Figure 1:
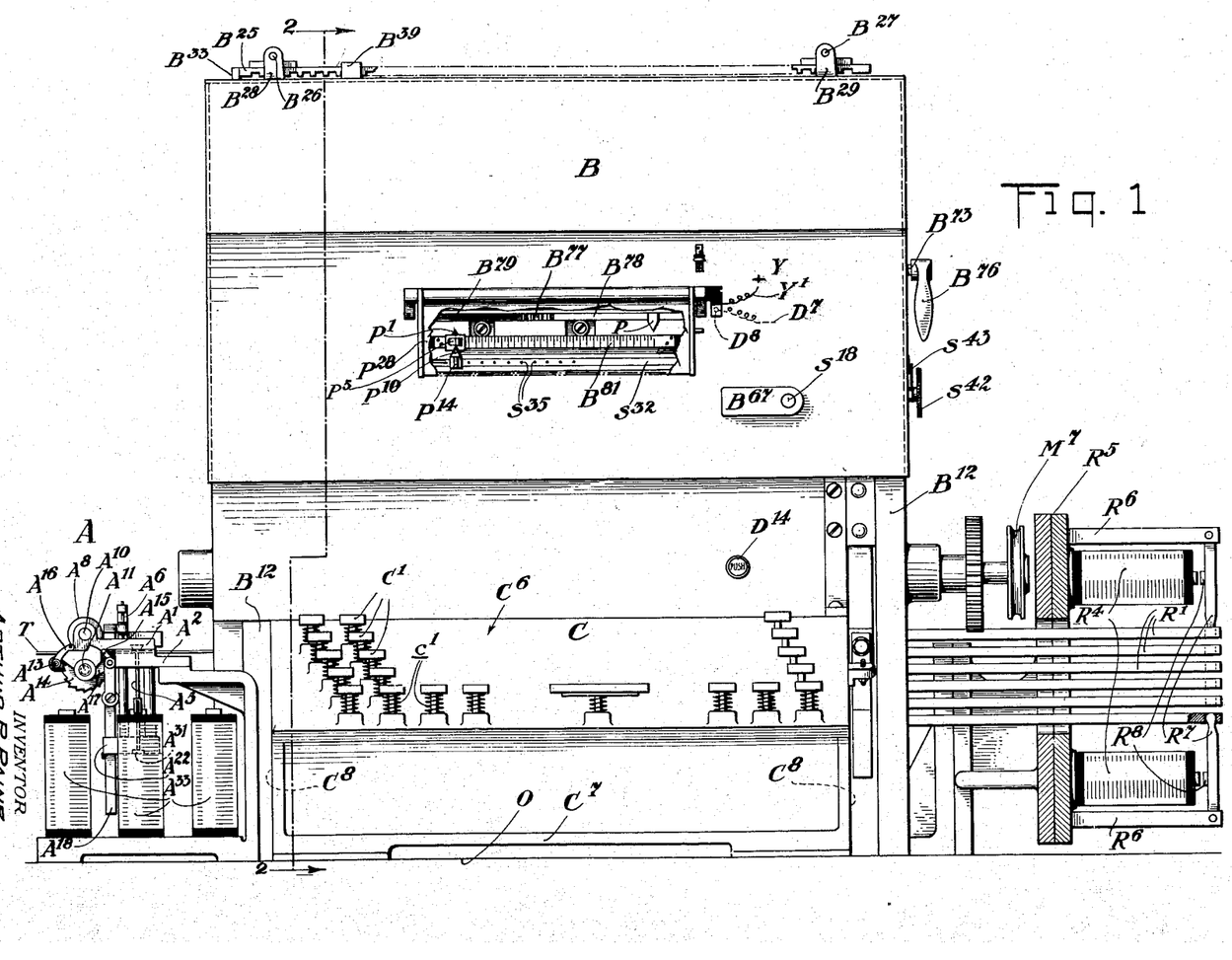
Fig. 1 is a front elevation of the improved machine.

The advance of the tape is effected by means of a pair of feed rollers A8 between which the tape is passed, the rollers being positioned one above the other on separate shafts A10 and A11 which may be journalled in extensions of the top guide plate A1. The lower roller is provided with a row of teeth, not shown, circumferentially positioned around the center of the roller and adapted to engage the feed perforations in the tape, while the upper roller A8 is provided with a peripheral groove, also not shown, but which serves the purpose of accommodating the feed teeth on the lower roller.

At the front end of the shaft A11, which carries the toothed roller, is a ratchet wheel A14, with which is associated a feed pawl A15 and a retarding detent A16, the former being pivotally connected to a horizontal rocker arm A17 loosely mounted on said shaft, and the latter being pivotally mounted at A13. According to this arrangement, when the arm A17 is rocked upwardly and downwardly, the ratchet wheel A14 is operated intermittently by the pawl A15 and the tape T fed step by step past the respective punch rods A5 and A6 by the toothed roller, not shown, but which has been mentioned heretofore and adequately described in the Ackerman copending application referred to above.

The rocker arm A17 is operated from a vertically-sliding member A18, which receives a limited up-and-down movement from a solenoid, (shown diagrammatically as A27 in Fig. 17) and which is energized each time a key on the keyboard is depressed. The punch rod A6 is also operated by the vertically-sliding member A18, which, when a key is depressed, is forced downwardly, the punch rod A6 making a feed perforation in the tape T. The upward or return stroke of the vertically-moving member A18 operates the rocker arm A17, causing the pawl A15 associated therewith to rotate the ratchet wheel and, consequently, the associated feed roller, through one space, advancing the tape. This upward movement of the member A18 also lifts the punch rod A6 clear of the tape and there is sufficient play between the pawl A15 and the ratchet wheel to permit the punch to clear the tape before the same is advanced. Retrograde movement of the ratchet wheel is prevented by the detent A16 when the pawl A15 is caused to ride over the teeth of the ratchet on the downward stroke of the member A18.

The perforators or punch rods A5 are intended to produce in the tape T, perforations which constitute the symbols hereinbefore referred to representing the different matrices and spacers used in the slug-casting machine to be controlled by the tape. The punch rods A5 are mounted and guided at their upper ends in the lower guide plate A2 and at their lower ends in the block A22, the latter being recessed in its lower face to receive a hardened strip A31, which serves to sustain the rods at such level that the upper ends thereof are located in proper spaced relation below the tape T. The several punch rods A5 are operatively connected by suitable means to as many different magnets A33, which latter are capable of functioning independently of each other in operating the punch rods to produce the symbols in the tape. The magnets are energized through separate circuits controlled by the keys C1 on the keyboard C in a manner to be hereafter explained, and their connection with the punch rods A5 is such that when a magnet is energized its associated punch rod will function to perforate the tape.

The keyboard (see Fig. 2) is preferably insulated from the bed plate O, to which it is secured, and comprises generally a top plate C6, a bottom plate C7 and two side plates C8. The finger keys C1 are in the form of vertically-disposed push rods, projecting downwardly through the top plate C6 and provided with collars or shoulders c which are held resiliently engaged with the lower face of said plate under tension of light compression springs c1 surrounding the rods and located directly beneath the key buttons. The lower ends of the key rods C1 terminate in the same horizontal plane and are connected respectively through small bell crank levers C9 to a corresponding series of fore and aft key bars C10, which are suspended near their rear ends by links C11 from the cross member of brackets C12 depending from opposite sides of the top plate C6. These key bars C10 present portions C13 inclined upwardly toward the rear, so that these inclined portions, for reasons presently to appear, will be moved edgewise as the key bars, through the links C11 and bell cranks C9, are swung rearwardly by the depression of the finger keys C1 (see dot and dash lines in Fig. 2). The springs c1 associated with the keys are adapted, of course, when the keys are released, to restore the parts to their normal position.

Figure 2:
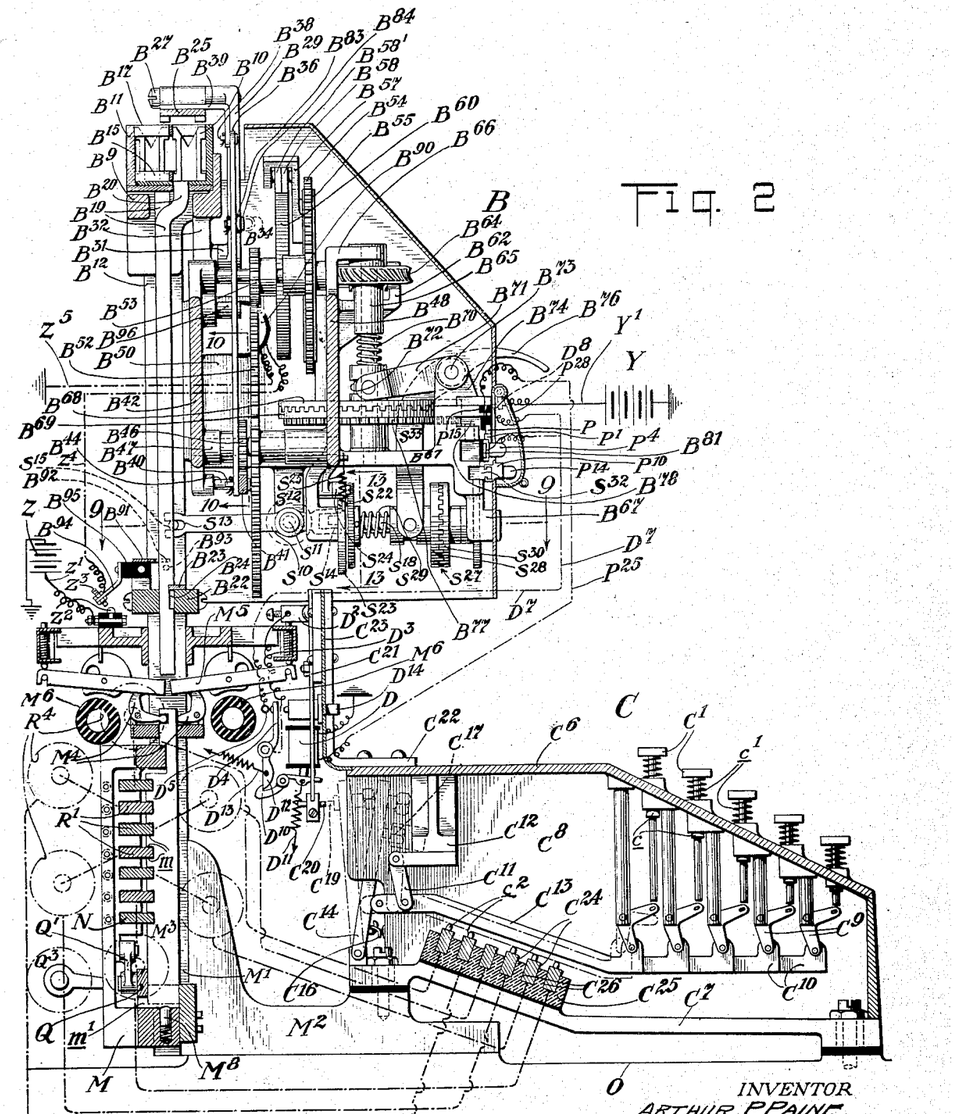
Fig. 2 is a section on line 2—2 of Fig. 1, illustrating the details of the key mechanism and the constructional details of the mechanism for operating the measuring device.

The keyboard mechanism also includes a vertically-disposed rocker plate C14 hingedly connected at its lower edge to the fixed bottom plate C7 and extending longitudinally across the keyboard with its front face in contact with the rear ends of the key bars C10. The plate C14 is resiliently held against the bars C10 by means of a spring C16 (the end only of which is shown in Fig. 2), and, at the right of the plate, a stop screw C17 is provided which limits the forward movement thereof. Associated with the plate is a terminal point C19, which is adapted, when the plate is swung about its hinged axis, to make and break an electric contact with a corresponding terminal C20 connected to a source of electric energy Y through a circuit breaker D. This circuit may be traced from the contact C20 through the conductor strip C21, the terminal D2, the wire connection D3, the circuit breaker arm D4, contacts D5, the conductor D7, switch connection D8, and the lead Y1 to the power source.

The terminal C20 is carried at the lower end of a flat spring metal strip C21, which is sustained by an angle piece C22 screwed to the top plate of the keyboard and insulated therefrom by a suitable strip of insulating material C23. When the two terminals C19 and C20 are brought into contact, a current is transmitted from the energy source Y through the circuit just described and through a series of intermediate conductor bars C24, through the punch magnets A33 and the feed solenoid which operates the vertically-moving member A18 as described in connection with Fig. 1.

The conductor bars C24 (six in number), one for each magnet A33, are arranged longitudinally of the keyboard C (from one side to the other) and are mounted in separate grooves C26 formed in a block of insulation C25, the latter being secured to the bottom plate C7 and located directly beneath the inclined portions C13 of the key bars C10 (see Fig. 2). Each conductor bar C24 is provided with a plurality of contact pins or points $c2$ spaced at different distances apart and projecting slightly above the top surfaces of said bars into the path of one or another of the key bars C10. These pins $c2$ are urged upwardly by resilient means, not shown, so as to insure a good contact with the bars C10 when the same are displaced rearwardly. The pins of the respective bars vary in number, but are alined transversely with the pins of adjacent bars so as to provide a definite predetermined combination of one or more contacts for each of the various finger keys. For instance, in the transverse group shown in Fig. 2, five of the six bars are equipped with contacts so that when the finger key corresponding to this group is depressed five of the six magnets A33 will be energized and the five punch bars associated therewith actuated to produce in the tape T the corresponding symbol for that key.

Figure 17:
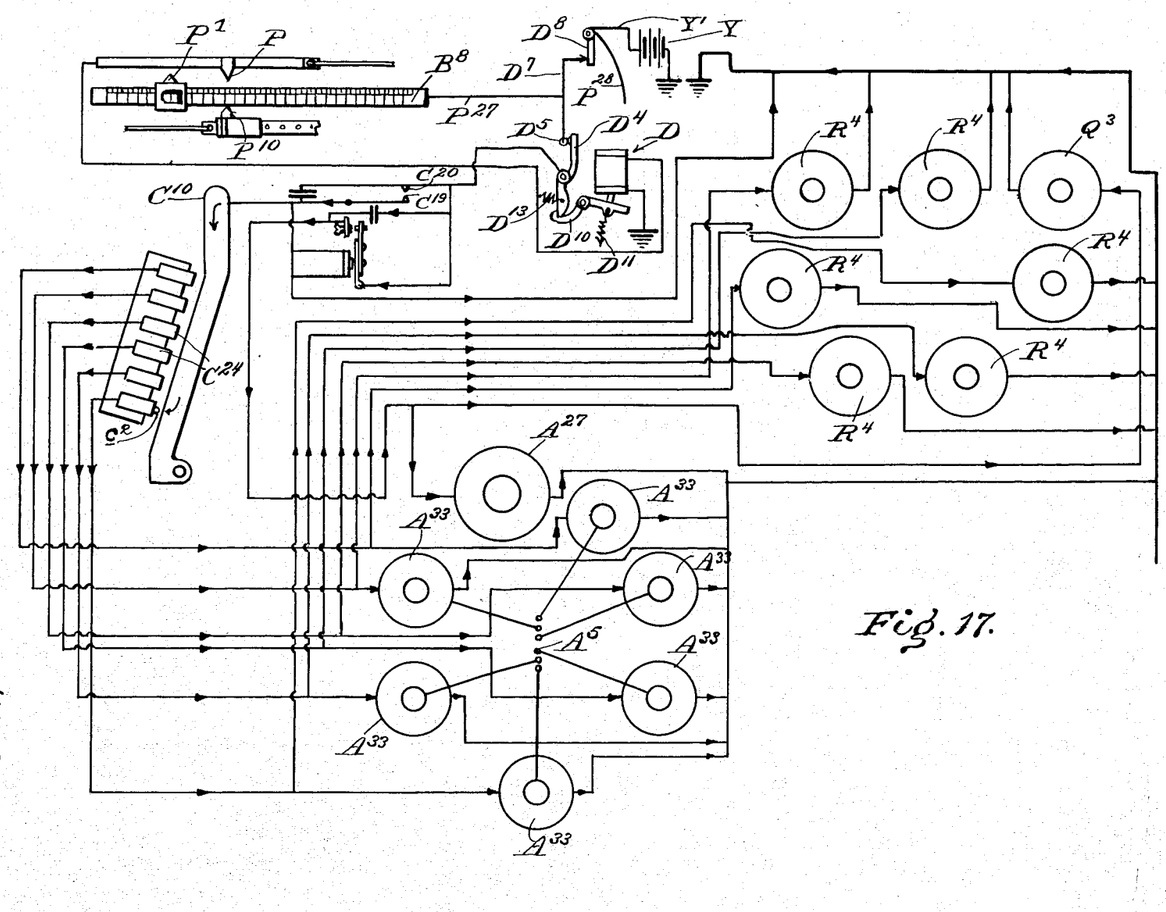
Fig. 17 is a diagram, showing the electrical connections by which the keyboard controls the operation of both the perforating unit and the dummy matrix selecting unit and also the connections for breaking the circuit should the operator attempt to compose a line longer than the capacity of the machine to be operated by the perforated tape.

As a result of the foregoing arrangement, when a finger key is depressed, the inclined portion C13 of the associated rocker bar C10 is swung into contact with certain conductor bars C24 through the appropriate contact pins $c2$ in the conductor bars, and the rear end of the rocker bar caused to rock the plate C14 rearwardly. As the terminal C19, associated with the plate, contacts with the terminal C20 on the conductor strip C21, the circuit through the source of current Y is closed and a current transmitted through the key bar C10 and conductor bars C24 to the corresponding magnets A33, which in turn actuate the particular punch rods A5 with which they are connected. A perforation combination or symbol is thus produced in the tape T representative of the character borne by the key depressed, which symbol is adapted to release a corresponding matrix when the tape is run through a linotype machine. The solenoid which operates the vertically-moving actuating member A18 is also energized at this time by the contact of the terminals C19 and C20, but through an independent circuit, so that the punching of the feed perforations is carried on simultaneously with the punching of perforation symbols and with each depression of the key. The circuits for energizing the feed solenoid and the magnets actuating the perforating punches are shown in Fig. 17 and more fully described in the Ackerman application above referred to. The solenoid circuit shown therein includes a relay which is intended as an element of safety to delay the advance of the tape until the punch rods A5 have been completely withdrawn therefrom. When the finger key is released the electrical contacts are instantly broken by the action of the spring C16 connected to the plate C14 and the springs $c1$ in restoring the parts to their normal positions. It might be stated at this time that the circuit breaker D is normally in a position to complete the circuit when the contacts C19 and C20 are closed.

While the symbols thus produced in the tape are capable of releasing the matrices and spacers they represent, the problem to be solved, as previously stated, is that of accurately determining the number of symbols which should be produced in the tape to represent a composed line of matrices and spacers of a given length. The present invention is intended to meet this situation by combining with the tape-perforating unit A a measuring device B, and by operating the measuring device from the keyboard C through intermediate mechanism later to be described, such that as each symbol is produced in the tape a dummy matrix or indicator corresponding in thickness to the matrix or spacer represented by said symbol is presented to the measuring device, and the results of the measurements accumulated additively by a suitable mechanism and indicated to the operator. In this way, whatever the length of line may be, the required number of symbols produced in the tape will be automatically determined when the pointer, in view of the operator, has traveled through a predetermined distance which has been selected as the length of the line.

Figure 5:
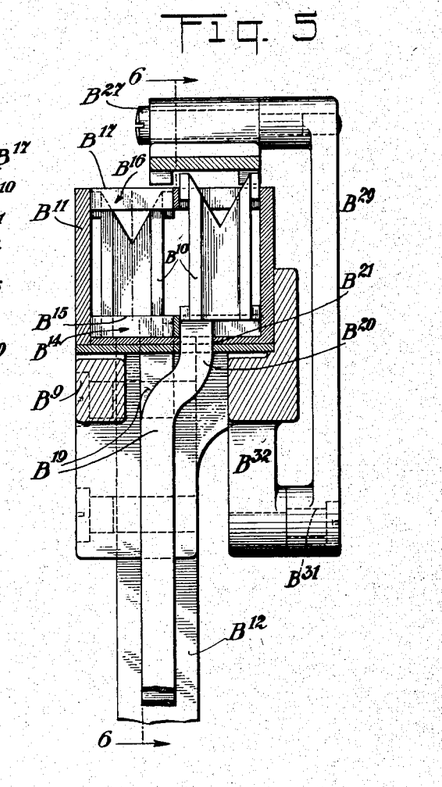
Figs. 5, 6, 7, and 8 illustrate the details of construction of the racks supporting the dummy matrices.
Figure 6:
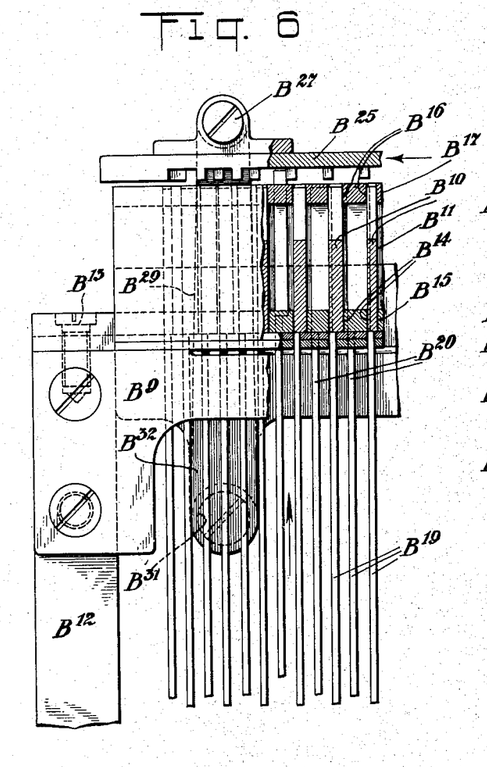
Figure 7:
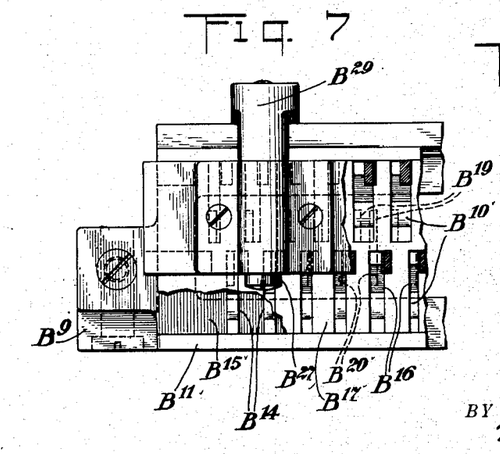
Figure 8:
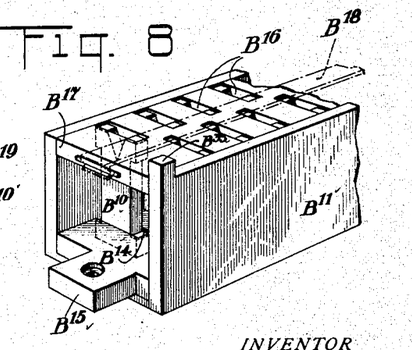

Referring to Figs. 2, 5, and 6, it will be observed that the frame of the machine comprises two upright members B12 at the sides thereof and a cross member B9 extending between the said upright members across the rear of the machine at the top. A set of dummy matrices or indicators B10 are supported in a rack B11 mounted on the cross frame members and secured thereto by means of screws B13, so that the rack is readily removable to facilitate the employment of different sets of dummy matrices or indicators corresponding to the different matrix fonts used in a linotype machine. As mentioned heretofore, these dummy matrices correspond in thickness or are proportional to the thickness of the matrices or spacebands being used in the linotype machine to be operated by the tape. A type of rack which may be used is shown in detail in Figs. 7 and 8. Here it will be seen that the dummy matrices are slidably mounted in slots B14 in the base B15 of the rack and in slots B16 in the top plate B17, the said slots serving to guide the dummy matrices in their vertical movement. It is desirable that some means be provided to retain the dummy matrices in their proper positions in the rack when changes of font are necessary, and for this purpose a removable bar B18 may be clamped along the top of the rack to retain the dummy matrices in the rack when the same is removed from the machine. The dummy matrices are preferably staggered in the manner shown for the purpose of conserving space.

The measuring rod for the dummy matrices is mounted above the rack, and as a key CI is depressed the corresponding dummy matrix is raised and presented thereto. The means for raising the dummy matrices comprise reeds B19, which are in some respects similar to the reeds used in an ordinary linotype machine for operating the matrix escapement mechanism. Due to the staggering of the dummy matrices every alternate reed has an offset portion B20, which is guided at its upper end in a slot B21 in the base of the dummy matrix rack, and at its lower end in a slot in the cross frame member B22 (Fig. 2). The movement of the reeds is limited by a plate B23 projecting into notches B24.

In Fig. 6 it will be observed that the relation of the reeds and dummy matrices is such that when a reed is actuated upwardly the dummy matrix associated therewith is likewise projected upwardly into the path of the measuring rod, which may be a toothed bar B25. As each reed corresponds to a different symbol of the perforated tape, the dummy matrix associated therewith will correspond in thickness to the corresponding matrix of the linotype machine operated by the tape.

Figure 4:
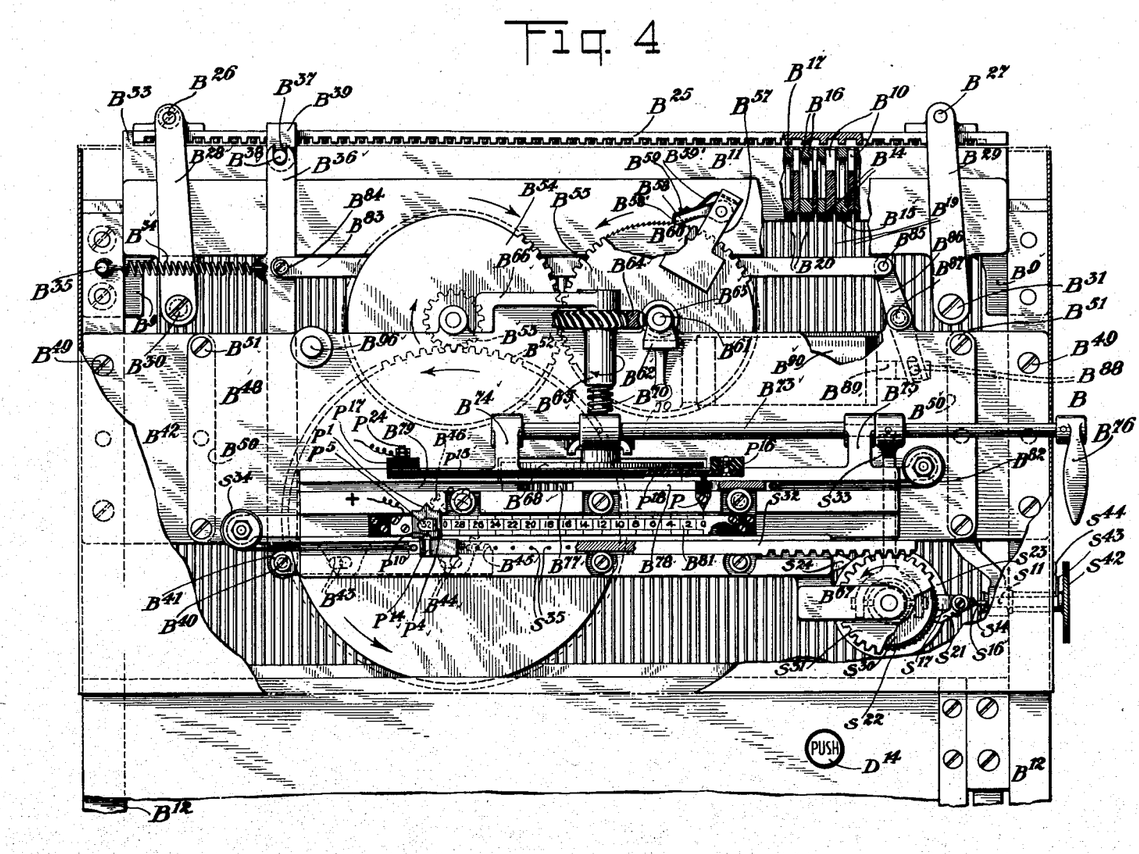
Fig. 4 is a front elevation, with part of the cover broken away, disclosing the internal operating mechanism.

As shown in Figs. 4 and 5, the measuring bar B25 is pivotally mounted at B26 and B27 on arms B28 and B29, respectively, these arms in turn being pivoted at B30 and B31 to downward extensions B32 of the frame member B12. The matrix rack B11 has a stop B33 at the left which limits the movement of the measuring bar B25 in this direction, and the bar is normally held against this stop by means of a spring B34 connected to the frame at B35 and to a pivoted link member B36, which latter has a U-shaped slot B37 at its upper end engaging a pin B38 on an angular-shaped bracket B39 fixedly secured to the measuring bar B25. The lower end of the link B36 is pivoted at B40 to a slidable link member B41 shown in Figs. 4 and 10. This member is fastened to a frame element B42 by pin and slot connections B43 and B44, and has a toothed rack B45 on its upper edge adapted to mesh with a gear B46 pinned to a shaft B47 mounted between the frame members B42 and B48 (Fig. 2). The frame member B42 is a plate fastened in suitable manner to the upright frame members B12 at both sides of the machine, as by screws B49, while the frame member B48 is mounted in spaced relation therewith by spacer plates B50 and screws B51.

Figure 3:
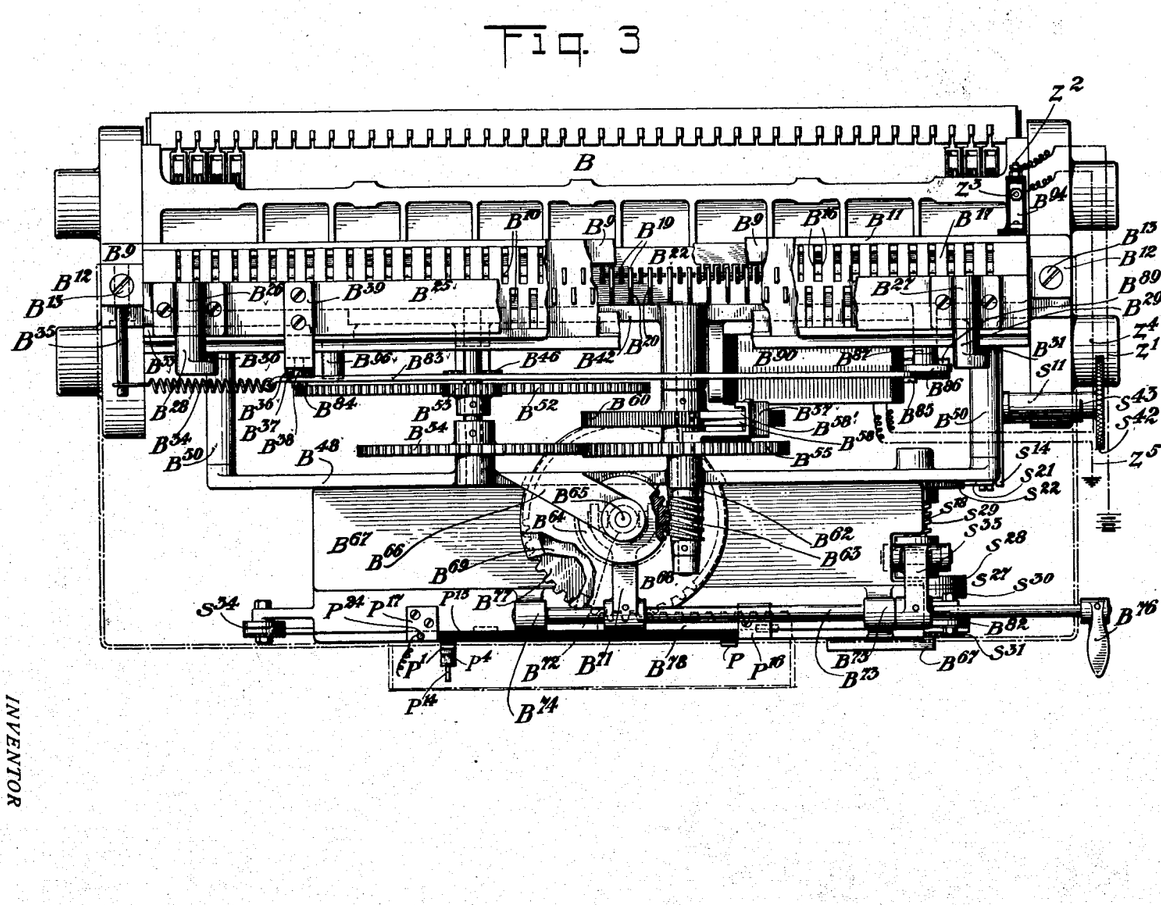
Fig. 3 is a plan view of the machine, with the cover removed to expose the internal operating mechanism.

It is apparent that any movement of the pivot point B40 of the link B36 will be imparted to the gear B46 through the link B41, and this motion is in turn transferred through suitable gears B52, B53 and B54 to the gear B55, on the latter of which is an arm B57 carrying pawls B58 and B58' held by means of springs B59 and B59' in engagement with a ratchet wheel B60. Gear B55 idles on the shaft B61 which is journaled in the frame member B42 and a bracket extension B62 on the frame member B48. The ratchet wheel B60 is pinned to this shaft, however, so that any rotation thereof is imparted to a worm B63 (Figs. 3 and 4), also pinned to the shaft. The worm engages a worm wheel B64 pinned to a vertical shaft B65, which has its bearings in bracket extensions B66 and B67 of the frame member B48. A clutch is also mounted on the shaft B65 consisting of two engageable notch-faced members B68 and B69, the first being splined to the shaft so as to be slidable axially therewith, and the second loosely mounted on the shaft, so that when the two members are engaged the rotation of the shaft is imparted to the lower member. The two clutch elements are normally held in engagement by a spring B70, but are adapted to be disengaged by an arm B71, which has diverging prongs carrying pins extending into an annular slot B72 in the hub of the top clutch member B68. As shown in Figs. 2, 3, and 4, the arm B71 controlling the engagement and disengagement of the clutch is pinned to a rod B73 journaled in extensions B74 and B75 of the frame bracket B67. The rocking of this shaft will, of course, disengage the clutch, and this is accomplished by a handle B76, also pinned to the shaft at the right end thereof within easy reach of the operator.

Secured to the lower clutch element B69, so as to be rotatable therewith, is a gear wheel B77 adapted to mesh with a rack B78 slidably mounted in a slot B79, also in the frame bracket B67. The rack carries a pointer indicator P, which moves along an em scale B81, the movement of the rack being against the tension of a coil spring B82 mounted at the right end of the frame bracket B67.

Referring again to Figs. 2 and 4, it will be observed that the link B36 attached to the measuring rod has another link B83 pivoted thereto at B84, which link at its other end is pivoted at B85 to a lever arm B86, the latter being pivotally supported by the frame at B87, and at its lower end attached by a pin and slot connection B88 to the armature B89 of a solenoid B90 supported by the rear frame element B42. This solenoid is energized from a source of power Z to which it is connected through the leads Z1, the switch contacts Z2 and Z3, the lead Z4, and the return lead Z5. The solenoid is energized every time that a reed B19 is raised, and this is accomplished by means of a plate B91 pivoted to upward extensions of the frame member B22, the plate having fingers B92 extending inwardly into the path of pins B93 on the reeds, so that as any reed is raised the plate B91 will be rocked, thus rocking the arm B94 and closing the contacts Z1 and Z2. The arm B94 is insulated from the plate B91 in any suitable manner, as, for instance, by the insulation block B95. Obviously, every time the solenoid B90 is energized, the link B36 is displaced to the right until it is brought to rest by the stop B96 which projects from the frame member B42.

The operation of the measuring device can now be readily understood. When a key CI on the keyboard C is depressed, simultaneously with the perforating operation, a certain selected reed B19 will be raised in a manner to be hereafter described. A dummy matrix B10, corresponding in thickness to the matrix of the linotype machine to be operated by the perforated tape, is projected into the path of the teeth on the measuring bar B25. When the dummy matrix has assumed this position, the stud B93 on the reed trips the plate B91, closing the contacts Z2 and Z3 and thereby completing the electric circuit through the solenoid B90. The pull of the solenoid on its armature rocks the arm B86, which, through the agency of the link B83, draws the link B36 to the right against the tension of the spring B34. During the first part of the movement, the link B36 pivots about the point B40 and displaces the toothed measuring bar B25 to the right until the dummy matrix is met by the tooth to the left. Further movement of the measuring bar is then prevented, in consequence of which the pivot pin B39 now acts as a fulcrum for the link B36. Further movement of the link B36 displaces the pivot point B40 to the right until the link is brought to rest against the stud B66. The distance through which the pivot point B40 moves after the bar B25 comes to rest against the dummy matrix is proportional to the thickness of the dummy matrix, for, obviously, the thickness of the dummy matrix determines the distance through which the measuring bar B25 moves and, consequently, the position of the pivot pin B39. Thus, in the case of a comparatively thick matrix, the distance through which the pin B39 moves before it becomes the pivot for the link B36 will be small, in consequence of which the distance through which the pivot B40 moves before it reaches the stop B66 is greater than if the pin B39 moved through a larger distance during the measurement of a thin dummy matrix. The movement of the pivot point B40 is accompanied by a similar movement of the link B41, and the amount of this movement is multiplied through the gearing previously described to cause rotation of the gear B55. This gear in turn rotates the ratchet wheel B60 through the pawls B58 and B58', and the object of the gear multiplication previously mentioned is to permit the use of teeth of reasonable size in the ratchet wheel with which the pawl is engaged. For instance, if the motion of the lever B36 were only one-thousandth of an inch, and it is desired to have a tooth size of at least twenty-five thousandths, a multiplication of twenty-five to one would be necessary. This may be produced by various well-known expedients, such as the use of multiple pawls or the employment of a ball friction clutch, but the drawings show the simplest method.

The rotation of the ratchet wheel B60 causes the rotation of the worm wheel B64 through its associated worm and, with the clutch elements B68 and B69 normally engaged, this rotation in turn is imparted to the gear wheel B77. This gear actuates the rack B78, causing the indicator or pointer P to traverse a portion of the em scale. This movement will be proportional to the space taken up by the matrix of the linotype machine to be operated by the tape. When the key, which was previously depressed, is released, the reed which was actuated thereby is returned to its normal position, together with its associated dummy matrix. The circuit through the solenoid B90 is broken and the link B36, together with the measuring bar B25, returned to normal position by the pull of the spring B34. The link B41 is also returned to the limits of the slotted connections B43 and B44, as is also the gear train which is actuated thereby. The pawls B58 and B58', however, merely drag over the ratchet wheel B60 without movement of the latter, so that the pointer P, which was displaced by the previous rotation of this wheel, remains in the position to which it was previously moved.

It is quite apparent, therefore, that a number of keys C1 can be depressed in succession to perforate the tape, and as each perforation combination is made, the pointer P continues to move intermittently across the scale to register after each movement the total space which will be taken up by the matrices of the linotype machine when it is operated by the tape.

Figures 14, 15, 16:
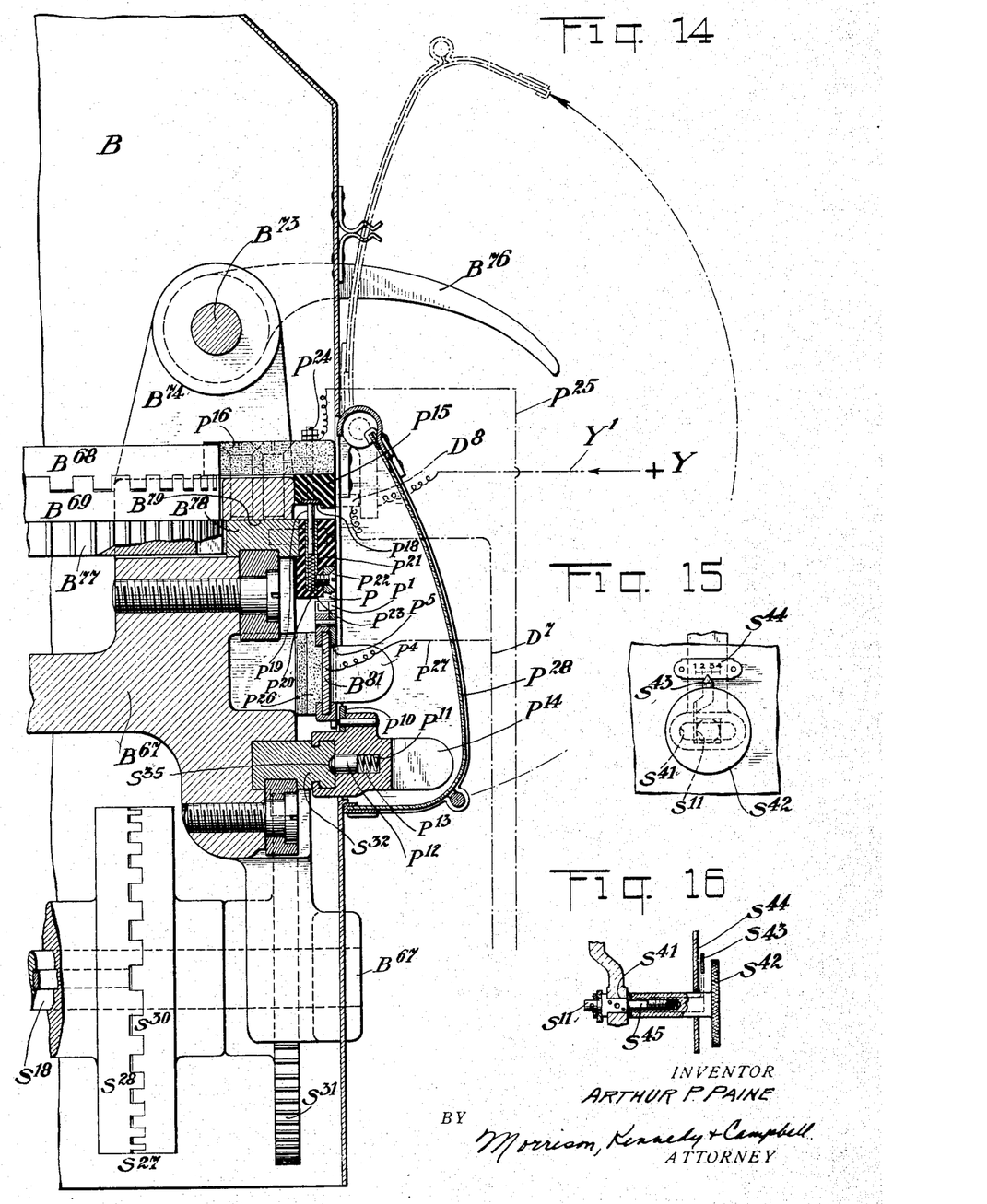

It is, of course, desirable that the operator be able to determine beforehand the length of the line to be composed. To facilitate this, a pointer P1 is provided, which may be mounted so as to be readily slidable along the scale B81, and to facilitate adjusting this pointer, a projecting finger grip P4 may be attached thereto and a window P5 provided through which the scale indications may be readily viewed. A large detail view of this mounting is shown in Fig. 14.

During the composition of a line it is quite likely that the operator will employ a number of spacebands or spacers. The dummy matrix which functions when the spacer key is depressed, however, only corresponds in width to the unexpanded thickness of the spaceband which would be used on the linotype machine. Some means must, therefore, be provided so that the operator will be able to determine when a sufficient number of letters have been used to make up a line of proper length after the line has been justified and the spacebands expanded. For this purpose an additional pointer P10 is provided, the functioning of which will be obvious from the following description.

Figures 9, 10, 13:
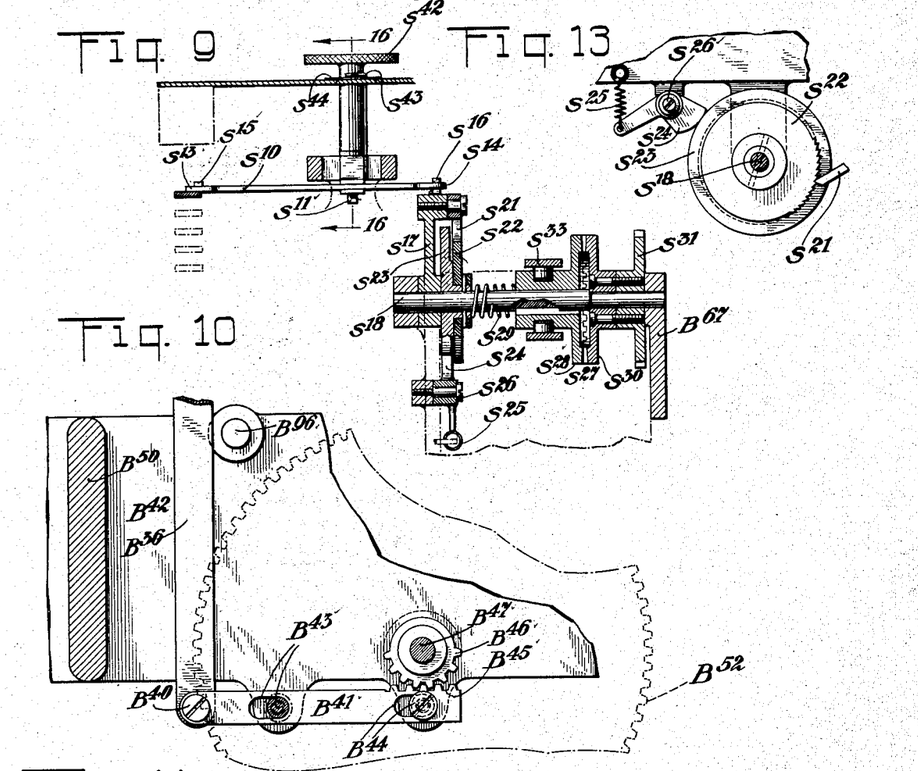
Fig. 9 is a partial section on line 9—9 of Fig. 2, illustrating the mechanism for operating the spaceband pointer.
Fig. 10 is a partial section on line 10—10 of Fig. 2, showing a portion of the measuring mechanism.
Fig. 13 is a partial section on line 13—13 of Fig. 2.

Referring to Figs. 2, 4, and 9, a lever arm S10 is shown pivoted at S11 to an arm S12 extending downwardly from the frame. Both ends of this lever are forked, as shown at S13 and S14, the forked end S13 straddling a stud S15 on the reed which functions when the space key is depressed. The other forked end S14 straddles a pin S16 mounted on the end of a rocker arm S17 rotatably mounted on the shaft S18, the ends of which are journaled in downwardly-extending arms of the frame member B67. The rocker arm S17 carries a pawl S21, which engages the teeth of a ratchet wheel S22, and in order to prevent rotation of the ratchet wheel other than through the agency of the pawl, it may be mounted on a brake wheel S23 against which a brake shoe S24 is urged by a spring S25 (Fig. 13), the shoe being pivoted at S26 to an extension of the frame. The brake wheel and ratchet wheel are both pinned to the shaft S18, while also upon this shaft is mounted a clutch S27, one element S28 of which is splined to the shaft so as to be slidable axially therewith. A spring S29 on the shaft normally holds the teeth of the clutch element S28 in mesh with the complementary teeth on the other clutch element S30, this latter element being rotatably mounted on the shaft S18 and having a gear S31 integral therewith, which is adapted to mesh with a rack S32, upon which is carried the pointer P10 previously mentioned. As shown in Fig. 2, this clutch also has a disengaging arm S33 similar to the one associated with the clutch member controlling the pointer P, and which is also operated when the shaft B73 is rocked by the handle B76.

The rack S32 carrying the pointer P10 is moved in a manner similar to the pointer P, i. e., against the tension of a coil spring S34 mounted on an extension of the frame at the left. It is desirable that the pointer P10 be adjustable along the rack S32, and for this purpose a number of depressions S35 are provided at intervals along the rack. The member bearing the pointer P10 (as shown in Fig. 14) has a recess P11 in which is positioned a pin P12 adapted to be urged in these depressions by a spring P13. As the end of the pin is rounded off, the operator will have no trouble in sliding the member bearing the pointer from one position to another, and to facilitate this the finger grip P14 may be provided.

Figure 11:
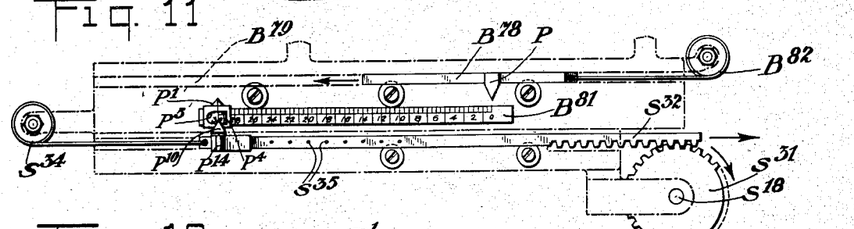
Figs. 11 and 12 illustrate the construction and operation of the pointers and their associated em scales.
Figure 12:
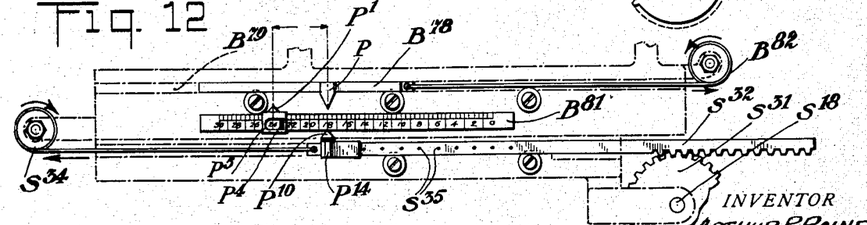

The operation of this phase of the invention is now clear. The operator first determines the length of the line to be composed and sets the pointer P1 at the graduation indicating the proper length. The pointer P10 is set so as to coincide with the position of the pointer P1 by sliding it to the proper depression S35. The initial setting of the scale for a 30-em line is shown in Fig. 11. The operator now proceeds in the usual manner by depressing the keys C1, and, as the dummy matrices are measured in the manner heretofore described, the pointer P moves to the left approaching the pointer P1. When a space key is depressed the pointer P moves through a distance equivalent to the distance that an unexpanded spaceband would take up in the line. At the same time, however, the reed, which is associated with the dummy matrix simulating the spaceband rocks the lever S10 by means of the stud S15 which is positioned on the reed, causing the arm S17 to be rotated in a clockwise direction, and the pawl S21 associated therewith rotates the ratchet wheel S22 and, consequently, the shaft on which it is secured. As the clutch is engaged, this rotation will be imparted to the gear S31, and as its direction of rotation is clockwise this gear will displace the rack S32 and, consequently, the pointer P10 to the right. The mechanism is so designed that the distance through which the pointer P10 is displaced for each operation of the spacer key is equal to the difference between the expanded and unexpanded thickness of a spaceband. Obviously, therefore, when these pointers meet, as shown in Fig. 12, the sum of the total thickness of the matrices plus the unexpanded thickness of the spacebands used, as indicated by the pointer P, added to the potential expansibilities of these spacebands, as indicated by the pointer P10, will equal the length of the line desired. The operator may end his line any time after the two pointers have met, but before the pointer P reaches the pointer P1, for the operator is assured that between these two limits the line when composed on a linotype machine will be justified out to its proper length.

After the completion of a line, it is only necessary for the operator to depress the handle B76. This rocks the shaft B73, thereby disengaging both of the clutches controlling the operation of the pointers P and P10. The manner in which disengagement is accomplished is evident from Fig. 2. Upon the disengagement of the clutches, the coil springs B82 and S34 function to return both the pointers to their initial positions, thus preparing them for the composition of the next line.

As mentioned heretofore, pointer P cannot be allowed to go beyond pointer P1, for to do so would result in casting a line longer than desired. To prevent such an occurrence, in the event that the operator, through inattention, fails to observe the proximity of the two pointers, means are provided, functioning when the two pointers come in contact, to disconnect the energy source from the machine, thereby rendering the keyboard inoperative. The circuit may thereafter be restored manually after the operator has prepared the machine for the composition of a new line. The construction and operation of the safety device is best illustrated in Figs. 2 and 14.

In Fig. 2 a circuit breaker D is shown consisting of a solenoid which, when energized, pulls up the latch D10 against the tension of the spring D11, thereby releasing the pivoted arm D4 which normally retains the circuit closed against the tension of spring D13. The energizing of the circuit breaker solenoid is controlled by the pointers P and P1. For this purpose a strip of insulating material P15 (Figs. 4 and 14) is provided extending over the entire length of travel of pointer P and suitably connected to the frame by blocks of insulating material P16 and P17. Extending lengthwise of the non-conducting strip P15 is a conductor bar P18, with which the pointer P is at all times in electrical contact through a pin P19 in a block of insulating material P20 carrying the pointer P. The pin P19 is carried in a metallic sleeve P21, which has electrical contact with the pointer P through the screw P22, while similar contact between the pin P19 and the conductor strip P18 is at all times assured by the spring P23 urging the two together. The conductor strip P18 has a terminal P24, to which is connected a lead P25 running to the solenoid of the circuit breaker and from thence to the ground. The pointer P1 is composed of conducting material, as is also the scale B81, the latter being insulated from the machine frame by blocks of insulating material P26. The scale is connected by a wire lead P27 to the main circuit lead P7, thus providing a path back to the source of current Y.

Thus, it is plain that if the operator inadvertently permits the pointers P and P1 to come in contact, a circuit will be completed from the source Y through the lead Y1, the main circuit lead D7, the conductor P27, the scale B81, the pointer P1, the pointer P through the pin contact P19, the conductor strip P18 to the lead P25, and from thence to the circuit breaker solenoid and back to the source of power. This operates the circuit breaker, tripping the arm D10, and releasing the arm D4 which breaks the circuit at contact D5, rendering the key mechanism functionally inoperative until the pointers are restored to their initial positions, whereupon the circuit breaker may be closed by means of the push button D14 (Fig. 2).

As the scale and pointers comprise parts of an electric circuit, a transparent cover P28 is provided therefor as a protective measure. This cover is adapted to swing up to the dotted position shown in Fig. 14 to facilitate setting of the pointers, and when this is done the switch contacts D8 are broken, thereby breaking the main circuit of the machine. The expansibility of the spacebands, which is indicated by the pointer P10, will vary according to the type of band used, and to take care of this an adjustment is provided at the right of the machine for changing the position of the pivot point of lever S10. The pin upon which this lever is pivoted is mounted in a slot S41 in the arm supporting the pivot pin (see Fig. 15). By varying the position of the pin, the stroke or distance through which the forked end S14 of the lever may move the pawl S21 and, consequently, the ratchet wheel S22, is correspondingly varied, the ratchet wheel in turn determining the movement of the pointer P10. The adjustment is facilitated by the thumb screw S42, which, together with the screw S45, holds the pivot pin in position in the slot. By loosening the thumb screw the position of the pivot pin may be adjusted as desired, and the amount of adjustment indicated by the pointer S43 and the scale S44 (Figs. 15 and 16).

The intermediate mechanism provided for operatively connecting the keyboard C with the measuring unit B will now be described. As best shown in Figs. 1, 2, and 3, this mechanism is carried in a frame M arranged at the rear of the keyboard and fastened to an upright side post M1 rising from fixed bracket members M2 on the bedplate O. The operative elements thereof consist of a series of vertical slides M3 mounted and guided in the frame M and which are formed with notches m in their rear edges, and at their extreme lower ends with lugs or shoulders m1 projecting rearwardly therefrom. These slides M3 correspond in number to the reeds B19 and are arranged below the same with their upper ends in position to control, through trip dogs M4, two rows of cam yokes M5, which are pivoted at their outer ends and disposed horizontally above a pair of rolls M6, the latter being driven constantly from a suitable source of power (not shown) transmitted to the belt wheel M7. The speed of driving the same is that used in the ordinary linotype machine. The inner ends of the yokes are located directly beneath the respective reeds, so that when a slide M3 is raised the cam yoke associated therewith will be released by the intervening trip dog and its rotary cam allowed to engage the periphery of the underlying roll M6. This engagement causes rotation of the cam and a consequent rocking of the yoke, which is adapted in turn to engage the reed above and lift it to actuate a corresponding dummy matrix. These power-operated devices are or may be the same as those employed in the standard linotype machine, and a more detailed description thereof is therefore unnecessary.

The slides M3 are raised by means of spring-actuated pins M8 mounted in the frame M beneath the respective slides, and are returned to their lower position against the action of the pins by a bar Q common to all of the slides and arranged in engagement with the lugs m1. Bar Q is suspended from the frame M near the opposite ends thereof by a pair of links Q1 situated at opposite sides of the machine and is movable longitudinally in opposite directions to lock and release the slides M3. Bar Q is normally held in its locking position by suitable resilient means, not shown, and a solenoid Q2, shown dotted in Fig. 2, is employed to swing the bar against the said resilient means to its releasing position. This solenoid is energized every time the rocker plate C14 makes a contact with the terminal C29, so that every time a key C1 is depressed the slides M3 are released for operation.

The operation of the slides M3 is controlled by a series of six horizontal main notched locking bars R1, and a master or auxiliary notched locking bar N, all of which are slidably mounted in the frame M for a slight longitudinal movement in opposite directions and are arranged in superposed spaced relation with their front or notched edges engaged with the respective notches m of the vertical slides M3. The purpose and operation of these bars are set forth in great detail in the Ackerman application heretofore referred to.

The main locking bars R1 are held resiliently toward the right under the tension of springs, not shown. The shifting of the bars in the opposite direction is effected by a series of magnets R4, each bar being connected to an individual magnet and operable thereby independently of the other bars. The several magnets (Fig. 1) are mounted upon a supporting bracket R5 formed with lateral extensions R6, the latter being located adjacent the respective magnets and projecting slightly beyond the outer ends thereof. The locking bars R1 extend through an opening in bracket R5 and are operatively connected to the respective magnets by intermediate plate levers R7 hinged to the extensions R6 and provided with contact points R8 alined with the magnet cores or poles.

The front edges of the bars R1 are formed with notches and intervening teeth or locking portions. The arrangement of these notches in the respective bars is such that by shifting the bars singly or in groups a slight distance to the left, they will provide a series of releasing combinations, one for each of the slides M3. Since but six locking bars R1 are employed to make up the releasing combinations for the slides M3, the highest possible number of combinations available would not be great enough to provide a separate combination for each of the different characters comprised within the normal matrix font of a linotype machine (usually ninety or more), and for this reason, some of the releasing combinations are duplicated on the bars R1. To be specific, the notches and teeth formed at the left of the bars R1, and which control the actuation of the slides M3 for the lower case characters, are duplicated at the right of the bars to control the actuation of the slides M3 for the corresponding upper case characters. As a result, when the locking bars are moved to the left to create a particular releasing combination for one letter, the slides M3 for both the upper and lower form of this letter would be unlocked and permitted to operate, were it not for the presence of the master locking bar N referred to before.

The master locking bar N is therefore adapted to lock against actuation the slides M3 of either the lower case group or the upper case group, as may be required. For this purpose, the bar is formed at its front edge with notches and intermediate solid or toothed portions, the notches and toothed portions being so arranged that when the bar is shifted to the right, the toothed portions at the right will lock the upper case slides M3 against actuation, while the notches at the left will release the lower case slides M3; whereas, when the bar is shifted to the left the toothed sections at the left will lock the lower case slides M3 against actuation, while the notches at the right will release the upper case slides M3. In this way, notwithstanding the duplication of the releasing combinations of the locking bars R1, only those of the upper case group or the lower case group will be permitted to operate when the locking bars are moved to the left in the manner before described.

The conductor bars C24 (Fig. 2) are connected by separate wires to the respective magnets R4, so that by the depression of the finger keys these magnets, as in the case of the punch magnets A33, are also independently energized from the generator Y and the operation of the bars R1 thus brought under the control of the keyboard C. Through the various combinations provided by the bars R1 for releasing the individual slides M3, and with the aid of the shift bar N, the keyboard C, which is of the ordinary typewriter variety, with approximately the same number of finger keys, is capable of controlling the operation of the reeds B19, which in number are approximately double that of the finger keys. The operation of the locking bar N is controlled by two special finger keys, not shown, which are located respectively in the lower right- and left-hand corners of the keyboard, one of them being marked UC and the other LC. When the finger key marked UC is depressed, the bar N is shifted to the left, thereby releasing the upper case group of slides M3; whereas, when the key marked LC is depressed the bar N is moved in the opposite direction to release the lower case group.

The operation of the machine and the manner in which the various units cooperate will have been understood from the detailed description given above, but a brief recapitulation may be helpful. Let it be assumed that a group of symbols is to be produced in the tape representing a line of matrices. If the initial character of the line is a capital letter, the key marked UC, designating upper case, is depressed, whereupon the key bar C10 connected therewith is moved into contact with the conductor bars C24, the combination of which will produce a symbol in the tape which, when used for operating a linotype machine will cause the upper case key thereof to function. Four separate circuits are energized upon the depression of a key. The first circuit transmits an electric current from the source of energy Y through the conductor bars C24 which are at that time in contact with the bars C10, and from there to the punch magnets A33 associated with the respective conductor bars, and thereafter to ground. The punch rods A5 associated with the magnets A33 are thus actuated and produce in the tape a perforation combination or symbol representative of UC, which, as mentioned heretofore, functions to operate the corresponding key of the linotype machine when the tape is used to operate the same.

The second circuit transmits an electric current from the source of energy Y through the same conductor bars to the magnets R4 corresponding thereto. The locking bars R1 connected to these magnets are thus shifted to the left to establish a releasing combination for special slides somewhat similar to the slides M3, but which function to release the master locking bar N heretofore mentioned.

The third circuit transmits a current from the source of energy Y to the solenoid Q3. As this solenoid is energized the retaining bar Q is swung to the left, freeing the slide controlling the bar N so as to shift the bar N to the left to lock the group of slides M3 controlling the lower case characters and to unlock the slides controlling the upper case characters.

The fourth circuit transmits a current from the source of energy Y to the feed solenoid which operates the overhead punch A6 (Fig. 1), which is thus actuated to produce in the tape a feed perforation whereby the tape T is advanced one step by the subsequent actuation of the pawl and ratchet devices A14 and A15.

In the foregoing operation, the only units brought into play are the keyboard and perforating mechanism. However, when a key bearing a character, as, for instance, a letter, is depressed, the same circuits will be established, differing, however, in the combination of magnets A33 rendered operable to produce in the tape a symbol corresponding to the said letter. Simultaneously therewith, magnets R4 are energized, which operate to shift the proper locking bars R1 toward the left to establish a releasing combination for the slide M3 corresponding to the letter whose key was depressed. After the solenoid Q3, which is energized every time any finger key is actuated, raises the retaining bar Q clear of the lugs m1, the affected slide M3 is allowed to rise under the influence of its spring-actuating means M8 and trip the cam yoke associated therewith. As the yoke rises it lifts the overlying reed B19, thus causing the dummy matrix associated therewith to be projected into the path of the measuring bar heretofore described.

It will now be seen that the present machine is well adapted to carry out the objects of the invention, functioning as it does to produce a symbol in the tape and at the same time measure the thickness of the matrix which will thereafter be rendered functional in the linotype machine when the tape is used to operate the same. In the embodiment herein illustrated, these operations are performed simultaneously by the use of selectively-controlled electrical devices connecting the perforating and measuring mechanism with the common keyboard. These electrical devices are only given by way of illustration, as it is obvious that the controlling connections might be effected in some other way, or by the use of some other form of mechanism, as, for example, a pneumatically-operated mechanism instead of electrically-operated mechanism. It should be understood, therefore, that the invention is not limited to any particular form or embodiment, except in so far as such limitations are specified in the claims.

Having thus described my invention, what I claim is:

1. In combination, a keyboard, a set of dummy matrices therefor having a fixed operative relation with the keys thereof and adapted for selective operation thereby, said dummy matrices representing the varying thicknesses of composing elements of a typographical composing machine, a measuring device comprising a bar positioned adjacent said dummy matrices and adapted for lateral movement with respect thereto, actuating means for said bar acting upon the displacement of a selected dummy matrix, to move the bar, means on the bar arranged to bank against a displaced dummy matrix and serving to arrest said bar after limited movement determined by the thickness of the displaced dummy matrix, and means controlled by said bar for indicating the aggregate thickness of successively displaced dummy matrices.

2. In combination, a keyboard, a set of elements having a fixed operative relation with respect to the keys of said board, said elements representing the thicknesses of matrices and the unexpanded thickness of spacebands of a typographical composing machine, a measuring device comprising a bar positioned adjacent said elements and adapted for lateral movement with respect thereto, actuating means for said bar acting upon the displacement of a selected element to move the bar, means on the bar arranged to bank against a displaced element and serving to arrest said bar after limited movement determined by the thickness of the displaced element, means controlled by said bar for indicating the thickness of successively displaced elements, and means functioning when a spaceband element is displaced to indicate the difference between the expanded and unexpanded thickness thereof.

3. In combination, a keyboard, a set of elements having a fixed operative relation with respect to the keys of said board, said elements representing the thicknesses of matrices and the unexpanded thickness of spacebands of a typographical composing machine, a measuring device comprising a bar positioned adjacent said elements and adapted for lateral movement with respect thereto, actuating means for said bar acting upon the displacement of a selected element, to move the bar, means on the bar arranged to bank against a displaced element and serving to arrest said bar after limited movement determined by the thickness of the displaced element, means controlled by said bar for indicating the aggregate thickness of successively displaced elements, and means actuated upon the displacement of a spaceband element for indicating the aggregate expansibility of the spacebands used.

4. In a machine for producing a perforated tape adapted to control the release of matrices and spacers of a typographical composing machine, the combination of a keyboard, a set of elements varying in thickness to correspond to the matrices and spacebands of said typographical composing machine, said elements being arranged side by side and in line with each other, a measuring bar disposed adjacent said elements, and movable laterally with respect thereto, means actuated from the keyboard for selectively displacing said elements toward said measuring bar, means for moving said bar through a distance depending upon the element displaced to measure the thickness thereof, and means for indicating the aggregate thickness of successively displaced elements.

5. In a machine for producing a perforated tape adapted to control the release of matrices and spacers of a typographical composing machine, the combination of a keyboard, a set of elements varying in thickness to correspond to the matrices and spacebands of said typographical composing machine, said elements being arranged side by side and in line with each other, a measuring bar disposed adjacent said elements, and movable laterally with respect thereto, said bar having a plurality of evenly spaced projections, one being provided for each element, means actuated from the keyboard for selectively displacing said elements toward said measuring bar, means for moving said bar until a projection thereon banks against a displaced element, the amount of said movement depending upon the thickness of said displaced element, and means controlled by said bar for indicating the aggregate thickness of successively displaced elements.

6. In a machine for producing a perforated tape adapted to control the release of matrices and spacers of a typographical composing machine, the combination of a keyboard, a set of elements varying in thickness to correspond to the matrices and spacebands of said typographical composing machine, and arranged in a rack adapted to prevent lateral movement of the elements, a measuring bar disposed adjacent the ends of said elements and arranged for lateral movement with respect thereto, said bar being provided with evenly spaced teeth, one for each element, means actuated from the keyboard for successively displacing said elements into the path of travel of their corresponding teeth, means for moving said bar until a tooth thereon banks against a displaced element, the amount of said movement depending upon the thickness of said displaced element, means controlled by the bar for indicating the aggregate thickness of successively displaced elements, and means for restoring the bar to normal position after each measurement.

7. In a machine for producing a perforated tape adapted to control the release of matrices and spacers of a typographical composing machine, the combination of a keyboard, a rack containing a series of matrices arranged side by side and each one corresponding to a different character of the font to be used with said machine, and containing also a matrix corresponding in thickness to the spacebands used in said composing machine, a measuring bar disposed adjacent said matrices and movable laterally with respect thereto, means actuated from the keyboard for selectively displacing said matrices for a limited distance toward said measuring bar, means for moving said bar through a distance depending upon the matrix displaced to measure the actual thickness thereof, and means controlled by said bar for indicating the aggregate thickness of successively displaced matrices, said matrices being returned to their respective positions in the rack before the measuring of the next displaced matrix.

8. A machine in accordance with claim 4, wherein the elements are mounted in racks, preventing lateral movement, and permitting only displacement toward the measuring bar.

9. A machine in accordance with claim 6, wherein the rack of elements is interchangeable with racks of elements corresponding to other fonts of typographical composing elements.

10. A machine in accordance with claim 5, wherein the elements are mounted in a rack preventing lateral movement of the elements and permitting their displacement only toward the measuring bar.

11. A machine in accordance with claim 7, wherein the rack of matrices is interchangeable with racks of matrices corresponding to other fonts of typographical composing elements.

12. In combination, a keyboard having means associated therewith adapted when acted upon to control the operation of matrices and spacebands of a typographical composing machine, a scale associated with said keyboard having means cooperating therewith for predetermining the length of a line to be composed on said machine, another element associated with said scale and rendered functional by the operation of said keyboard for indicating the condition of the line at all times, and means including both of said means associated with said scale for rendering the keyboard inoperative when the predetermined length of said line has been reached.

13. In combination, a keyboard, electrically operated, and having means associated therewith adapted when acted upon to control the operation of matrices and spacebands of a typographical composing machine, means associated with said keyboard for predetermining the length of a line to be composed on said machine, another element controlled by the operation of said keyboard and adapted to indicate the growth of the line being composed, a circuit breaker in the electrical circuit of said keyboard controlled by said element, and functioning to break the circuit when the predetermined length of said line has been reached.

14. In combination, a keyboard, a set of indicators associated therewith having a fixed operative relation with respect to the keys of said board, said indicators representing the thicknesses of matrices and spacebands of a typographical composing machine and adapted to be presented selectively to a measuring device when said keys are operated, electrical means for operating said measuring device each time a key is depressed to determine the thickness of the indicators presented thereto, means operated by said measuring device for aggregating the results of said determinations, whereby the growth of a line being composed is indicated to the operator, means for predetermining the length of said line, and means controlled by said aggregating means for rendering said keyboard inoperative when the predetermined length of said line has been reached.

15. In combination, a keyboard, a set of indicators therefor having a fixed operative relation with respect to the keys of said board, said indicators representing the thickness of matrices and spacebands of a typographical composing machine, measuring means cooperative with each indicator when the same is rendered operative by its associated key, for determining the thickness of the matrices and the unexpanded thickness of the spacebands, means actuated by said measuring means for additively registering the results of said determinations, and means also functioning when a spaceband indicator is rendered operative to indicate the difference between the expanded and unexpanded thickness thereof, said means being adjustable to accommodate for spacebands of different sizes.

16. In a machine for producing a record adapted to control the release of matrices and expansible spacers of a typographical composing machine, the combination with means for preparing the record, of apparatus operable to indicate the aggregate thicknesses of matrices and unexpanded spacers in a composed line as represented by the record, means for indicating the expansibility of the spacers in the composed line, mechanism for actuating said means as the record of the spacers is made, and means for adjusting said mechanism for spacers having different degrees of expansibility.

17. In a machine for producing a record adapted to control the release of matrices and expansible spacers of a typographical composing machine, the combination with means for preparing the record, of apparatus operable to indicate the aggregate thicknesses of matrices and unexpanded spacers in a composed line as represented by the record, means for indicating the expansibility of the spacers in the composed line, and mechanism including an adjustably pivoted lever for actuating said means, whereby differences in the expansibility of spacers may be indicated.

18. In an apparatus for producing perforated strips for the control of typographical machines, a keyboard including character keys and a spacer key controlling the perforation of the strip, an indicator controlled by said keys comprising means operative through the character keys for indicating the cumulative thickness of matrices, means responsive to the spacer key for indicating the range of expansibility of the word spacers, and means for changing the operative relationship between said spacer key and the means operated thereby for varying the extent of its operation for each operation of the spacer key in accordance with different types of word spacers.

19. An apparatus for preparing a record adapted to control the release of matrices and spacebands of a typographical composing machine and including, in combination, a scale, means movable with respect to said scale under certain operating conditions to indicate the width of expansibility of the spacebands, a mechanism for operating said means, and means comprising proportionally adjustable instrumentalities interposed between said first recited means and said mechanism for adjusting the operative relationship between said first recited means and said mechanism for varying the degree of movement of said first recited means for spacebands of different widths of expansibility.

20. An apparatus for preparing a record adapted to control the release of matrices and spacebands of a typographical composing machine and including, in combination, a scale, means movable with respect to said scale under certain operating conditions to indicate the width of expansibility of the spacebands, a reciprocating mechanism for operating said means, and means comprising proportionally adjustable instrumentalities interposed between said first recited means and said mechanism for adjusting the operative relationship between said first recited means and said mechanism for varying the degree of movement of said first recited means for spacebands of different widths of expansibility.

21. In a keyboard, a plurality of members movable under different operating conditions, a plurality of keys corresponding to a series of characters, means operated upon the depression of each of said keys for effecting the movement of one of said members an amount predetermined by the particular key depressed, a special key, means actuated by said special key for controlling the movement of another of said members differentially relatively to the member controlled by the character keys, and means for varying the differential operation of said other member.

22. An apparatus for preparing a record adapted to control the release of matrices and spacebands of a typographical composing machine and including, in combination, a scale, means movable with respect to said scale under certain operating conditions to indicate the width of expansibility of the spacebands, a mechanism for operating said means, and adjustable means for changing the operative connection between said means and said mechanism to vary the degree of movement of said first recited means for spacebands of different widths of expansibility.

23. An apparatus for preparing a record adapted to control the release of matrices and spacebands of a typographical composing machine and including, in combination, a scale, means movable with respect to said scale under certain operating conditions to indicate the width of expansibility of the spacebands, a mechanism for operating said means, and means for adjusting the ratio between said means and said mechanism for varying the degree of movement of said first recited means for spacebands of different widths of expansibility.

24. A machine for preparing a record adapted to control the release of matrices of a typographical composing machine and including, in combination, a keyboard, means controlled from the keyboard for preparing the record, a frame, a set of elements arranged in said frame corresponding to the matrices of a given font and corresponding also to the keys of said keyboard, said elements being adapted upon the operation of said keys to be displaced a limited amount in said frame, an indicator, and means movable with respect to said elements and controlled by the element displaced for operating said indicator to indicate the aggregate thickness of the matrices represented in the record, said frame and the elements mounted therein being removable as a unit and replaceable by a frame equipped with a different set of elements to adapt the machine to prepare a record for the release of matrices of a font having matrices of a different width respectively to the matrices of the given font before mentioned.

25. A machine for preparing a record adapted to control the release of matrices and expansible spacebands of a typographical composing machine and including, in combination, a keyboard, means controlled from the keyboard for preparing the record, a set of elements corresponding to the matrices and spacebands of a given font, said elements being selectable individually by the operation of said keys, an indicator, means controlled by the elements selected for operating said indicator to indicate the aggregate thickness of the matrices represented in the record, said set of elements being removable and replaceable by a different set of elements to adapt the machine to prepare a record for the release of matrices of a font having matrices of a different width respectively to the matrices of the given font before mentioned, means for indicating the expansibility of the spacebands in the composed line represented by the record, mechanism for actuating said means as the record of the spacebands is made, and means for adjusting said mechanism for spacebands having different degrees of expansibility.

ARTHUR P. PAINE.